Jan. 5, 1971   S. J. FRIEDLAND   3,552,198
TORQUE MEASURING DEVICE
Filed July 23, 1968

United States Patent Office 3,552,198
Patented Jan. 5, 1971

3,552,198
TORQUE MEASURING DEVICE
Samuel J. Friedland, Jericho, N.Y., assignor to Collectron Corporation, New York, N.Y.
Filed July 23, 1968, Ser. No. 746,960
Int. Cl. G01l 3/16
U.S. Cl. 73—134                                  1 Claim

ABSTRACT OF THE DISCLOSURE

A device for determining static and dynamic torque of a rotary device including a housing and a shaft mounted for rotation within said housing, including means for rotating the housing at a predetermined rate, and weighted lever means frictionally engageable upon the shaft, said lever means cooperating with scale means indicating a value corresponding to torque developed.

---

This invention relates generally to the field of torque measurement on a continuous, reproducible basis, and more particularly to an improved torque measuring device suitable for use with precision rotary switches and other devices employing a commutator.

In the present state of the art, limited test equipment available is not capable of measuring, with any degree of precision, torques below 0.05 ounce-inch. In addition, various other difficulties related to performance beset the torque watch, of the type disclosed, for example, in U.S. Pat. No. 2,091,022, the only known device commercially used to a substantial extent.

It is therefore among the principal objects of the present invention to provide an instrument which will read the starting torque of a rotary device with maximum precision and ease, where the torques involved are at a very low level.

Another object of the invention lies in the provision of an improved device of the class described, in which the cost of fabrication may be of a reasonably low order, directly comparable with existing prior art devices, thereby permitting consequent wide sale distribution and use.

Still another object of the invention lies in the provision of an improved torque measuring device which may be of relatively simple construction, thereby assuring a relatively long and useful life.

Yet another object of the invention lies in the provision of an improved torque measuring device which may be conveniently adjusted for measuring varying types of rotational devices with relatively small modification.

These objects, as well as other incidental ends and advantages, will more fully appear during the progress of the following disclosure, and be pointed out in the appended claim.

Figure 1:
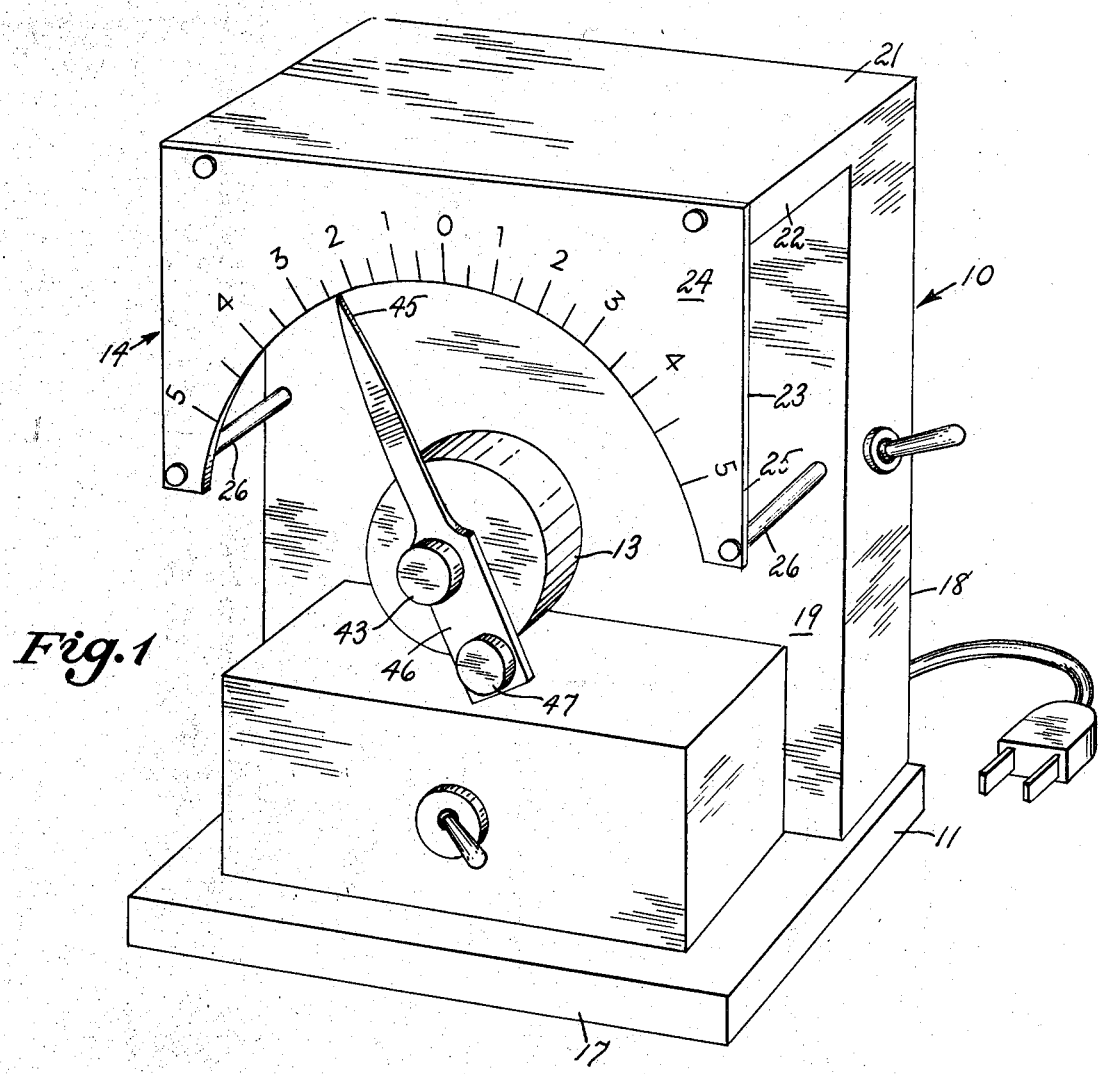

In the drawing, to which reference will be made in the specification, FIG. 1 is a view in perspective of an embodiment of the invention.

Figure 2:
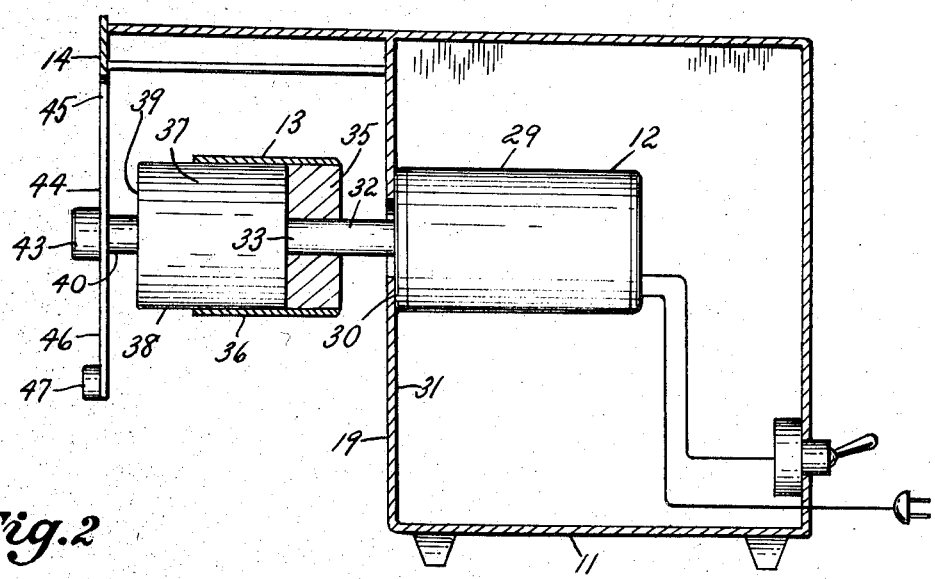

FIG. 2 is a schematic central sectional view thereof.

Before entering into a description of the structural aspects of the disclosed embodiment, a brief review of the theory involved is believed apposite.

All rotating electro-mechanical components require some input torque for operation. Systems containing these components specify a maximum allowable torque. The fact that these torques must all be accurately measured underlines the need for a dependable testing tool. Systems engineers, moreover, must be able to determine what proportion of the total available drive torque is to be allotted to each particular component. A device fulfilling the above requirement must measure accurately both frictional torque and the torque of an accelerating mass. The latter, developed from Newton's Second Law (expressed as $T=mr2a=Ia$, where $a$ refers to the angular acceleration of the rotating mass), is related to the moment of inertia of the rotating body and system response time. If the component meets the inertia requirement, then it will probably meet with the systems inertial torque requirement.

Frictional torque, the type most specified in systems, is a combination of wiper and bearing friction. Bearing friction is a function of the lubrication, size and number of balls, surface finish and shaft loading. The wiper frictional torque can be estimated by $T=\mu MR$ where $\mu$ is the coefficient of friction of the wiper-surface interface.

Another significant breakdown of frictional torque is into static or break away torque, and dynamic or running torque.

Static torque refers to the precise moment applied when initial rotation occurs, when a stationery shaft sufficiently overcomes the static friction. The observed magnitude of the instantaneous break away torque is a function of the test speed. As will more fully appear, the disclosed embodiment establishes this speed as one revolution per minute as standard.

The dynamic torque, a function of kinetic friction, is lower than the static torque. Although the dynamic torque decreases with an increased speed, the magnitude of this change can be considered negligible.

An illustration of a varying frictional coefficient is a pulsating torque. Values of pulsating torques normally do not exceed those of the static torques. If large pulsating torques cannot be tolerated, lubrication of the contact surfaces or wiper redesign is necessary.

The actual method of use of the disclosed embodiment is simple. The unit to be tested is held by its outer housing and directly friction-coupled to the rotating shaft of a weighted pointer. The pointer is equipped with a frictional collar enabling such attachment. As the unit rotates, with housing and shaft at synchronous speeds, the internal static friction deflects the indicating lever to some maximum value. This value is related to static torque. As the unit continues to rotate, the indicating lever stabilizes at a deflected value which is related to dynamic torque. By the use of a synchronous speed previously established, there is no acceleration involved, and thereby consideration of inertial torque is eliminated. The angle of deflection of the lever is related to the moment produced by the weight.

Using the formula, torque equals $WR \sin \theta$, torque values on the reading scale may be obtained in two ways:

(1) Some desired full scale deflection of 68° of a weight located at 0.820 inch from the pivot point will be equal to a torque of 0.05 ounce-inch.

$WR = T/\sin \theta = 0.05/0.927 = 0.0539$ ounce-inch
$W = 0.0539/0.820 = 0.0658$ ounce-inch (2) An alternate calibration method is to attach the indicating arm to a balanced mass capable of rotating between frictionless pivots. The attachment of a known weight at a known radius will deflect the arm equal to a calculatable torque.

With the foregoing discussion in mind, reference may now be made to the drawing, in which there is illustrated an embodiment of the invention, generally indicated by reference character 10, comprising a base or casing element 11, a synchronous motor element 12, a chuck element 13, and a torque indicating element 14.

The base or casing element 11 includes a bottom or base member 17, a rear wall 18, a front wall 19, and an upper wall 21, a forward part 22 of which mounts a scale plate 23, the forward surface 24 of which is provided with measuring indicia. The lower part of 25 of the scale plate is supported on posts 26.

The synchronous motor element 12 includes a housing 29, the forward surface 30 of which is secured to the inner surface 31 of the front wall 19. A shaft 32 projects there through, and, as has been mentioned, rotates at a stable speed of one revolution per minute. The outer end 33 of the shaft 32 mounts the clutch element 13.

The clutch element 13 includes a base member 35 and a generally cylindrical sleeve 36 having a foam rubber lining 37 for engaging of the outer surface 38 of a device 39 to be tested. The device 39 includes its own shaft 40 rotatable relative to the surface 38.

The indicating element 14 includes a frictional hub 43 engageable upon the shaft 40, and an indicating lever or needle 44 including a pointer portion 45 and an oppositely disposed portion 46 mounting a predetermined weight 47.

During operation, the device to be tested is mounted as shown in FIGS. 1 and 2, and the shaft 32 is rotated in desired direction at predetermined speed. Until the static friction is overcome, the hub 43 will rotate with the shaft 40, whereby the indicating portion 44 will move along the indicia on the surface 24 to indicate a value corresponding to frictional torque. Once this friction is overcome, the needle will then stabilize at a lower level which will correspond to static torque. Where a number of similar devices are to be tested, it is necessary only to disengage the device 39 from the clutch element 13, remove the hub 43 from the shaft 40, and replace with a different similar device.

I wish it to be understood that I do not consider the invention limited to the precise details and structure shown and set forth in this specification, for obvious modifications will occur to those skilled in the art to which the invention pertains.

I claim:

1. a device for determining static and dynamic torque in a rotating device, in which the device includes a housing and a shaft mounted for rotation relative to said housing, comprising: a base element, a motor mounted upon said base element and rotatable at a predetermined angular velocity, said motor having an output shaft, chucking means operably connected to said output shaft and having means thereon for engaging said housing of said rotating device, a weighted lever having a predetermined motion moment of inertia, and having means engaging said shaft of said rotating device; and indicating means cooperating with said lever whereby, upon rotation of said motor, said housing of said device will rotate, moving said lever therewith with respect to said indicating means to an observable point where static friction is overcome, following which said pointer will stabilize at a second position, with respect to said indicating means under the action of gravity to indicate dynamic friction.

References Cited

UNITED STATES PATENTS

| 1,557,956 | 10/1925 | Zubaty | 73—136 |
| 2,091,022 | 8/1937 | Stuart | 73—9 |
| 2,887,875 | 5/1959 | Curriston | 73—9 |
| 3,027,748 | 4/1962 | Brenner | 73—1 |
| 3,396,576 | 8/1968 | Anderson | 73—1X |

FOREIGN PATENTS

| 865,390 | 2/1953 | Germany | 73—10 |

CHARLES A. RUEHL, Primary Examiner

U.S. Cl. X.R.

73—1, 9